(12) United States Patent
Koved et al.

(10) Patent No.: US 8,387,111 B2
(45) Date of Patent: *Feb. 26, 2013

(54) TYPE INDEPENDENT PERMISSION BASED ACCESS CONTROL

(75) Inventors: Lawrence Koved, Pleasantville, NY (US); Anthony Joseph Nadalin, Austin, TX (US); Nataraj Nagaratnam, Morrisville, NC (US); Marco Pistoia, Yorktown Heights, NY (US); Bruce Arland Rich, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 3848 days.

This patent is subject to a terminal disclaimer.

(21) Appl. No.: 10/002,439

(22) Filed: Nov. 1, 2001

(65) Prior Publication Data

US 2003/0084324 A1    May 1, 2003

(51) Int. Cl.
*G06F 12/14*    (2006.01)
(52) U.S. Cl. ............ 726/2; 726/3; 726/4; 726/5; 726/27
(58) Field of Classification Search .................. 713/200, 713/201
See application file for complete search history.

(56) References Cited

U.S. PATENT DOCUMENTS

| | | | |
|---|---|---|---|
| 5,572,677 A | 11/1996 | Luther et al. | 395/200.04 |
| 5,764,900 A | 6/1998 | Morris et al. | 395/200.33 |
| 5,768,126 A | 6/1998 | Frederick | 364/400.01 |
| 5,822,523 A | 10/1998 | Rothschild et al. | 395/200.17 |
| 5,890,017 A | 3/1999 | Tulkoff et al. | 395/885 |
| 5,913,038 A | 6/1999 | Griffiths | 395/200.61 |
| 5,987,608 A * | 11/1999 | Roskind | 713/200 |
| 6,047,377 A * | 4/2000 | Gong | 713/201 |
| 6,192,395 B1 | 2/2001 | Lerner et al. | 709/204 |
| 2003/0018909 A1 * | 1/2003 | Cuomo et al. | 713/200 |

* cited by examiner

*Primary Examiner* — Kaveh Abrishamkar
(74) *Attorney, Agent, or Firm* — Yee & Associates, P.C.; Jeffrey S. LaBaw (57) ABSTRACT

A method and apparatus for type independent permission based access control are provided. The method and apparatus utilize object inheritance to provide a mechanism by which a large group of permissions may be assigned to a codesource without having to explicitly assign each individual permission to the codesource. A base permission, or superclass permission, is defined along with inherited, or subclass, permissions that fall below the base permission in a hierarchy of permissions. Having defined the permissions in such a hierarchy, a developer may assign a base permission to an installed class and thereby assign all of the inherited permissions of the base permission to the installed class. In this way, security providers need not know all the permission types defined in an application. In addition, security providers can seamlessly integrate with many applications without changing their access control and policy store semantics. Moreover, application providers' security enforcement is no dependent on the security provider defined permissions. The method and apparatus do not require any changes to the Java security manager and do not require changes to application code.

24 Claims, 9 Drawing Sheets

```java
import java.security.BasicPermission;
import java.security.Permission;
import java.security.PermissionCollection;
import java.util.Hashtable;
import java.util.Enumeration;

public class IBMPermission extends BasicPermission
{
    public IBMPermission()
    {
        super (" ");
        System.out.println("Constructor IBMPermission() called");
    }
    public IBMPermission(String target)
    {
        super(target);
        System.out.println("Constructor IBMPermission(target.) called");
    }
    public IBMPermission(String target, String actions)
    {
        super(target, actions);
        System.out.println("Constructor IBMPermission(target, actions) called");
    }
    public boolean implies(Permission perm)
    {
        System.out.println("IBMPermission.implies() called");
        if (perm instanceof IBMPermission)
            return true;
        return false;
    }
    public PermissionCollection newPermissionCollection()
    {
        return new IBMPermissionCollection();
    }
}
```

```
final class IBMPermissionCollection extends PermissionCollection
    implements java.io.Serializable
{
    private Hashtable permissions;

public IBMPermissionCollection()
    {
            permissions = new Hashtable();
    }
    public void add(Permission permission)
    {
            if (! (permission instanceof IBMPermission))
                throw new IllegalArgumentException("Invalid Permission: " +
                                                                    permission);
            IBMPermission ibmp = (IBMPermission) permission;
            permissions.put(ibmp.getName(), permission);
    }
    public boolean implies (Permission permission)
    {
            if (! (permission instanceof IBMPermission))
                    return false;

System.out.println("permission instanceof IBMPermission == true");

IBMPermission ibmp = (IBMPermission) permission;
            String permName = ibmp.getName();
            Permission x = (Permission) permissions.get(permName);

if (x != null)
            {
                System.out.println("We have a direct hit! " + x.getName());
                return x.implies(permission);
            }

Enumeration permEnum = permissions.elements();

while (permEnum.hasMoreElements())
            {
                    x = (IBMPermission) permEnum.nextElement();
                    System.out.println(x.getName());

if (x.implies(permission))
                            return true;
            }
            return false;
    }
    public enumeration elements()
    {
            return permissions.elements();
    }
}
```

*FIG. 7B*

```
import java.security.PermissionCollection;
import java.security.AccessController;
import java.security.AccessControlContext;
import java.security.AccessControlException;
public class WSPermission extends IBMPermission
{
    public WSPermission(String target)
    {
        super(target);
        System.out.println("Constructor WSPermission(target) called");
    }
    public WSPermission(String target, String actions)
    {
        super(target, actions);
        System.out.println("Constructor WSPermission(target, actions) called");
    }
    public WSPermission()
    {
        super("");
        System.out.println("Constructor WSPermission() called");
    }

/**
     * Returns a new IBMPermissionCollection object for storing IBMPermission
     * objects.
     * <p>
     * An IBMPermissionCollection stores a collection of
     * IBMPermission permissions.
     * <p>
     * IBMPermission objects must be stored in a manner that allows them
     * to be inserted in any order, but that also enables the
     * PermissionCollection <code>implies</code> method
     * to be implemented in an efficient (and consistent) manner.
     *
     * @return a new IBMPermissionCollection object suitable for
     *         storing IBMPermission's.
     */
    public PermissionCollection newPermissionCollection()
    {
        System.out.println("newPermissionCollection() was called");
        IBMPermissionCollection ibmPC = new IBMPermissionCollection();
        // the code here checks if an IBMPermissionCollection has been granted.
        // If yes, then the PermissionCollection returned by this
        // method should contain a WSPermission.
        AccessControlContext acc = AccessController.getContext();
        try
        {
            acc.checkPermission(new IBMPermission("PermissionTest"));
            ibmPC.add(new WSPermission("PermissionTest"));
        }
        catch (AccessControlException ace)
        {
            System.out.println("IBMPermission WAS NOT GRANTED");
        }
        return ibmPC;
    }
}
```

```java
import java.io.*;

public class PermissionTest
{
    public static void main(String args[])
    {
        try
        {
            SecurityManager sm = System.getSecurityManager();

if (sm != null)
            {
                System.out.println("SecurityManager is checking for " +
                                    "WSPermission");

sm.checkPermission(new WSPermission("PermissionTest"));
            }

System.out.println("WSPermission was granted. " +
                                "Permission testing worked.\n\n\n");

File inputFile = new File("C:\\winzip.log");
            FileInputStream fis = new FileInputStream(inputFile);
            InputStreamReader isr = new InputStreamReader(fis);
            BufferedReader br = new BufferedReader(isr);

String lineRead;
            while ((lineRead = br.readLine()) != null)
                System.out.println(lineRead);
        }
        catch (Exception e)
        {
            e.printStackTrace();
        }
    }
}
```

TYPE INDEPENDENT PERMISSION BASED ACCESS CONTROL

BACKGROUND OF THE INVENTION

1. Technical Field

The present invention is directed to an improved data processing system and, in particular, an improved mechanism for permission based access control. More specifically, the present invention provides a mechanism through which a security provider may specify their own permission type and a permission type that can handle any application permission types.

2. Description of Related Art

In Java Development Kit (JDK) version 1.1, local applications and correctly digitally signed applets were generally trusted to have full access to vital system resources, such as the file system. Unsigned applets were not trusted and could access only limited resources. A security manager was responsible for determining which resource accesses were allowed.

In the Java 2 Software Developer's Kit (SDK), the security architecture is policy-based and allows for fine-grained access control. In Java 2 SDK, when code is loaded by the classloader, it is assigned to a protection domain that contains a collection of "permissions") based on the security policy currently in effect. Each permission specifies a permitted access to a particular resource, such as "read" and "write" access to a specified file or directory, or "connect" access to a given host and port. The policy, specifying which permissions are available for code from various signers and/or locations, can be initialized from an external configurable policy file. Unless a permission is explicitly granted to code, it cannot access the resource that is protected by that permission. These concepts of permission and policy enable the Java 2 SDK to offer fine-grain, highly configurable, flexible, and extensible access control. Such access control can be specified not only for applets, but also for all Java code including but not limited to applications, Java beans, and servlets.

Because the Java 2 SDK provides such a flexible and extensible access control, Application vendors end up specifying different security policies in terms of their own permission types, thereby introducing their own type of permissions into the security policy. In order to provide access control functionality to these "customized" permissions, security provider implementors that create these custom permissions must make sure they understand these customized permission types and need to make sure they support them. For example, if the application code checks for "com.foo.security.AppPerm1", then the security provider needs to check "com.foo.security.AppPerm1."

With evolving e-business and discrete sets of permissions getting introduced by many application providers, the number of permissions that need to be handled grows exponentially. This also creates a tight coupling between the application provider and the security provider. This results in the security policy being placed in the application code, making code portability an issue. This tight coupling needs to be avoided to provide seamless support to varied applications.

SUMMARY OF THE INVENTION

The present invention provides a method and apparatus for type independent permission based access control. The present invention solves the problems of the prior art by allowing security providers to specify their own permission type and a permission that can handle any application permissions below it in a hierarchy of permissions.

The present invention utilizes object inheritance that is built into the Java programming language to provide a mechanism by which a large group of permissions may be assigned to a codesource without having to explicitly assign each individual permission to the codesource. With the present invention, a base permission class, also referred to as a superclass permission class, is defined from which other (sub) permissions inherit thus creating a hierarchy of permissions. Having defined the permissions in such a hierarchy, a developer may assign a base or superclass permission to an installed codesource and thereby assign all of the inherited permissions of the base permission to the installed codesource. Thus, new applications may be installed and the developer or user need only assign the base permission in order for the new application to work with other previously installed applications.

In this way, security providers need not know all the permission types defined in an application. In addition, security providers can seamlessly integrate with many applications without changing their access control and policy store semantics. Moreover, application providers' security enforcement is not dependent on the security provider defined permissions. The present invention does not require any changes to the Java Ssecurity Mmanager and does not require changes to application code.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7C illustrates an exemplary subclass permission according to the present invention;

DETAILED DESCRIPTION OF THE PREFERRED EMBODIMENT

The present invention provides a mechanism by which permissions in an object oriented environment may be defined and used such that a single base permission, hereafter referred to as a superclass permission, may be assigned to a codesource and all inherited permissions, hereafter referred to as subclass permissions, falling under the base permission are thereby assigned to the codesource. In this way, a developer need not explicitly assign all of the possible permissions to the class but may assign only the base permission and obtain the benefit of any inherited permissions falling under the base permission in the permissions hierarchy.

The preferred embodiments of the present invention will be described with regard to the Java 2 SDK, however the present invention is not limited to use with Java 2 SDK. Rather, the present invention may be used with any object oriented environment in which inheritance and security policies are utilized to protect access to computer system resources. Thus, the references to Java 2 SDK and elements of this programming environment are only intended to be exemplary and are not intended to imply any limitation on the present invention.

Since the present invention operates in a Java security environment, a brief description of the Java computing environment will be provided. As is well known, Java is typically used in a client/server or other distributed data processing environment, although Java may also be used on a single computing device as well. As such, the following description of the Java computing environment will assume a client/server environment although the present invention may also be used by a single computing device with or without a network connection.

Figure 1:
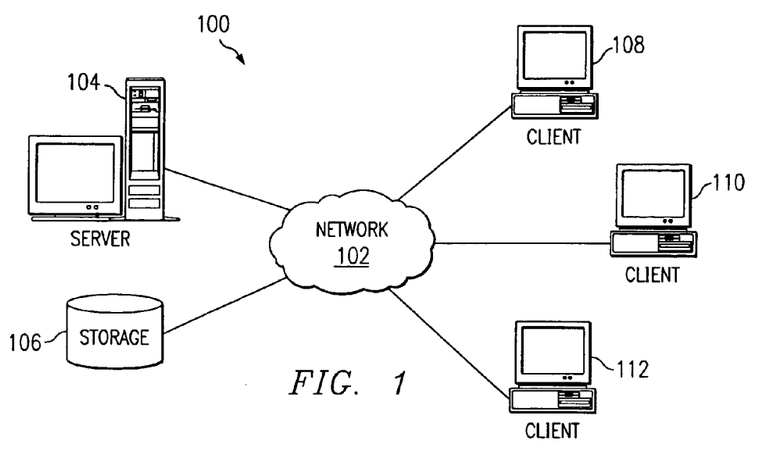
FIG. 1 is an exemplary diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
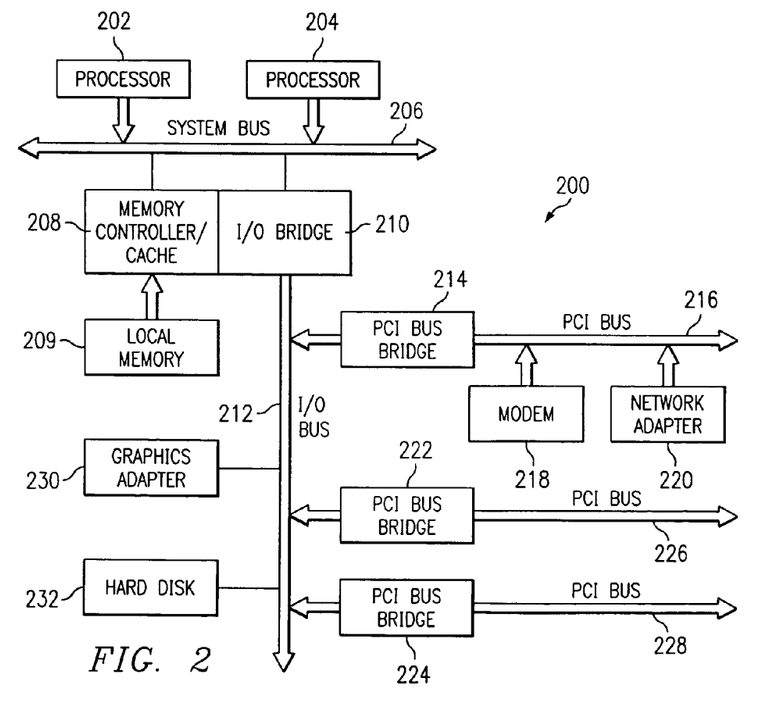
FIG. 2 is an exemplary diagram of a server computing system according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
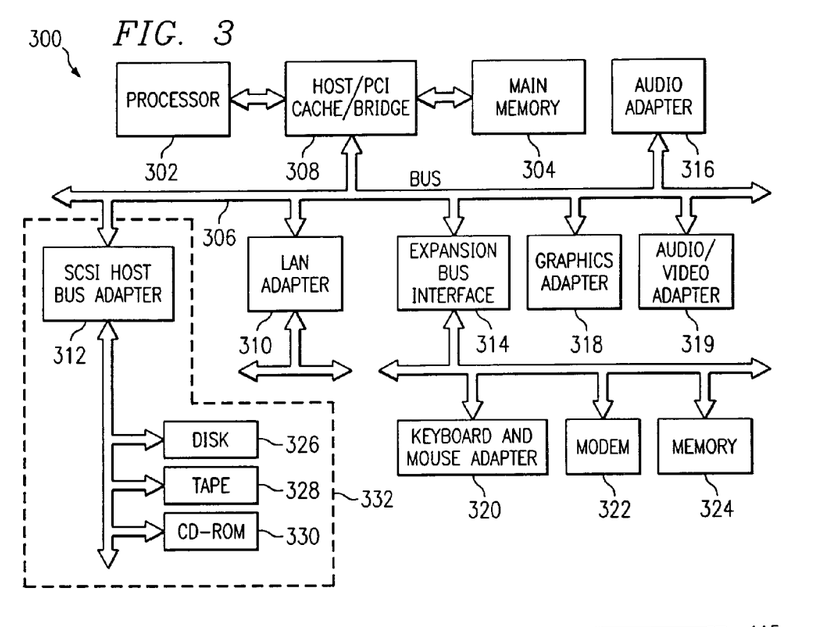
FIG. 3 is an exemplary diagram of a client computing system according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
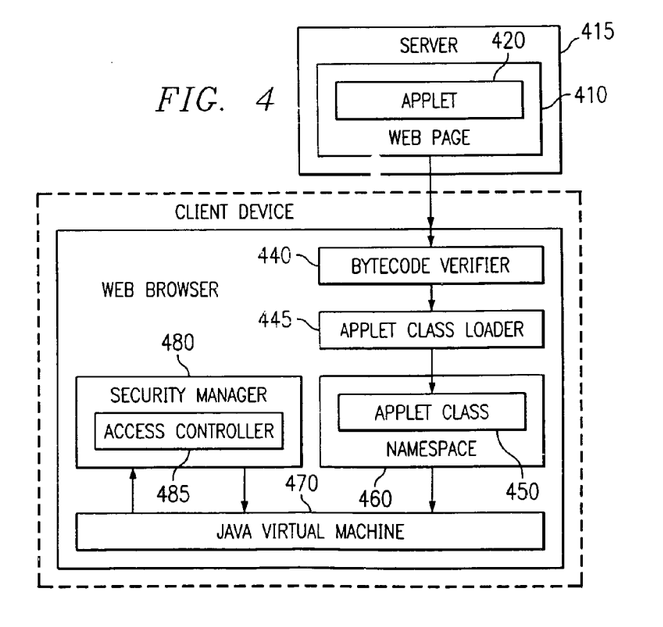
FIG. 4 is an exemplary diagram illustrating a Java Virtual Machine.

FIG. 4 shows how a Java applet is handled using a Java Virtual Machine (JVM) that implements the Java 2 SDK security architecture. As shown in FIG. 4, a web page 410 may include a hyperlink, or the like, to a Java applet 420. When a user of the web browser 430 selects the hyperlink, or otherwise initiates the download of the applet 420, the applet code is fetched from the server 415 associated with the applet 420. The fetched code is verified by a byte-code verifier 440 and the applet is instantiated as a class or set of classes 450 in a namespace 460 by a class loader 445.

At the time the classes 450 of the applet are instantiated, the JVM 470 also builds a protection domain for the applet 420. The protection domain is a data structure in which a set of permission collections are present. A permission collection is a grouping of permissions defined by a developer. Every time a developer defines a new permission, the developer must also define a permission collection to which the new permission belongs or assume the default implementation. These permission collections may be assigned to classes 450 of the applet 420. Thus, when the classes are instantiated, the JVM looks at the permission collections assigned to the classes and generates a protection domain based on the assigned permission collections.

The bytecode is then executed by the JVM 470. The bytecode is executed as threads of execution. A thread is a stream of execution. Threads allow multiple streams of execution to occur virtually simultaneously in a data processing system thereby allowing multitasking. An executing thread has a thread stack. The thread stack is a mechanism for tracking which method calls which other method in order to be able to return to the appropriate program location when an invoked method has finished its work.

During execution, the bytecode may make calls to potentially dangerous, or untrusted, functionality. When such a call is made by a thread of execution, the SecurityManager 480 calls a SecurityManager.checkPermission( ) method which in turn calls an AccessController.checkPermission( ) method of the Access Controller 485.

The SecurityManager 480 is the part of a JVM that enforces the security policy of the computing system on which the JVM is resident. When an untrusted operation is to be performed by an application, the SecurityManager 480 is responsible for checking whether the application has the appropriate permission for performing the operation.

A permission represents access to a resource. In order for a resource access to be allowed, the corresponding permission must be explicitly granted to the code attempting the access. A permission typically has a name and, in some cases, a comma-separated list of one or more actions. For example, the following code creates a FilePermission object representing read access to the file named abc in the /tmp directory:

perm=new java.io.FilePermission("/tmp/abc","read");

In this permission, the target name is "/tmp/abc" and the action string is "read".

It is important to note that the above statement creates a permission object that represents, but does not grant access to, a system resource. Permission objects are constructed and assigned, or granted, to code based on the policy in effect. When a permission object is assigned to some code, that code is granted the permission to access the system resource specified in the current security manager when making access decisions. In this case, the (target) permission object is created based on the requested access, and checked against the permission objects granted to and held by the code making the request.

The security policy for an application environment is represented by a Policy object. In the default implementation, PolicyFile, the policy can be specified within one or more policy configuration files. The policy file(s) specify what permissions are allowed for code from specified code sources. A sample policy file entry granting code from the /home/sysadmin directory read access to the file /tmp/abc is:

grant codeBase "file:/home/sysadmin/" {
Permission java.io.FilePermission "/tmp/abc",
"read";
};

In the Java Development Kit 1.1, it was the responsibility of the SecurityManager to directly call a check( ) method on untrusted resource access requests in order to determine if the resource access request should be granted. In Java 2 SDK, it is the AccessController 485 that calls the AccessController.checkPermission( ) method on permission objects.

When the AccessController.checkPermission( ) method is called by the AccessController 485 on a permission object, the AccessController 485 retrieves the AccessControlContext for a thread of execution that resulted in the call of the AccessController.checkPermission( ) method. The AccessControlContext is a combination of an array of protection domains for the classes in the thread stack, and a CodeSource. The CodeSource is a combination of an origination location of a resource access request and a set of zero or more digital signatures.

Having retrieved the AccessControlContext, the Access Controller 485 calls an AccessControlContext.checkPermission( ) method on the AccessControlContext. The AccessControlContext.checkPermission( ) method calls an AccessControlContext.implies( ) method which in turn calls implies ( ) on each protection domain identified in the AccessControlContext to determine if the particular permission being checked is present in each of the ProtectionDomain objects. This causes an implies ( ) method to be called on the java.security.Permissions object in each of the ProtectionDomains. This, in turn, causes an implies ( ) method to be called on each permission in each PermissionCollection specific to that type. In this way, each permission in each relevant PermissionCollection of each ProtectionDomain identified in the AccessControlContext is checked to see if it corresponds to the permission being checked.

If the results of this check indicate that any one of the protection domains does not include the requisite permission, i.e. the permission being checked, then the requested resource access is denied. Thus, all protection domains identified by the AccessControlContext must include the permission being checked in order for the access request to be granted. This enforces the requirement that each ProtectionDomain include at least one permission collection that includes the permission being checked.

Thus, in known systems, a developer of an application must possess a sufficient amount of knowledge about the security policy and permissions of a particular computing system in order to make sure that the new application may work with the existing system and system resources. The application developer must know each new permission and identify a PermissionCollection to which the new permission belongs. The present invention provides a mechanism by which such detailed knowledge of the security policy and permissions is not required and applications may be installed with relative ease.

With the present invention, permissions are defined in a hierarchical manner such that there are superclass permissions and subclass permission of the superclass permission. The result is a tree-like structure of permissions that may be assigned to classes of installed applications.

Figure 5:
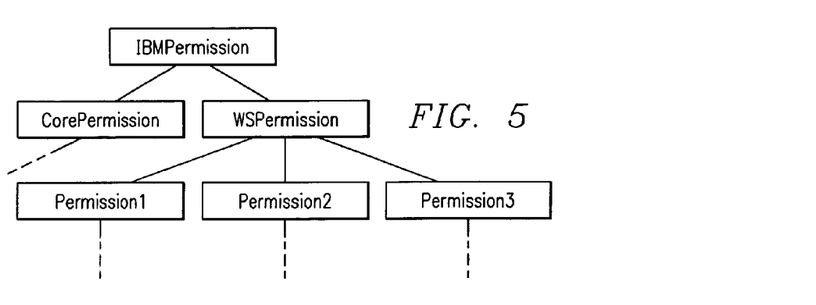
FIG. 5 is a diagram illustrating a permission hierarchy according to the present invention.

FIG. 5 is an exemplary diagram of a permissions hierarchy according to the present invention. As shown in FIG. 5, a superclass permission is defined as IBMPermission. This superclass permission has a plurality of subclass permissions including CorePermission and WSPermission. In turn, these subclass permissions may have further subclass permissions including Permission1, Permission2 and Permission3. The subclass permission WSPermission is a superclass permission to Permission1, Permission2 and Permission3.

With the present invention, when a class is assigned a superclass permission, all subclass permissions of the superclass permission are also allocated to the installed class. For example, if the superclass permission WSPermission is assigned, or granted, to an installed class, the subclass permissions Permission1, Permission2 and Permission3 are also allocated to the installed class. In this way, the developer need only know about the superclass permission and grant the superclass permission to the installed class in order to obtain the benefit of all of the subclass permissions.

This is especially beneficial for applications that are part of the same overall product. If a developer adds an application to an existing product, for example, the developer need only assign a superclass permission of an existing permission hierarchy of the product to the new application. In this way, the application developer need not know the detailed layout of the existing permissions and yet obtain the benefit of existing permissions by inheritancy through the permissions hierarchy.

The present invention provides the ability to allocate all subclass permissions of a superclass permission to an installed class of an application by placing these permissions into the PermissionCollection of the superclass permission. This may be done in a number of different ways, two of which will be described in detail hereafter. These two mechanisms for placing subclass permissions into the PermissionCollection of the superclass permission are preferred embodiments, however, the invention is not limited to such. Rather, any mechanism for allocating subclass permissions of a superclass permission that is granted to an installed class may be used without departing from the spirit and scope of the present invention.

Figure 6:
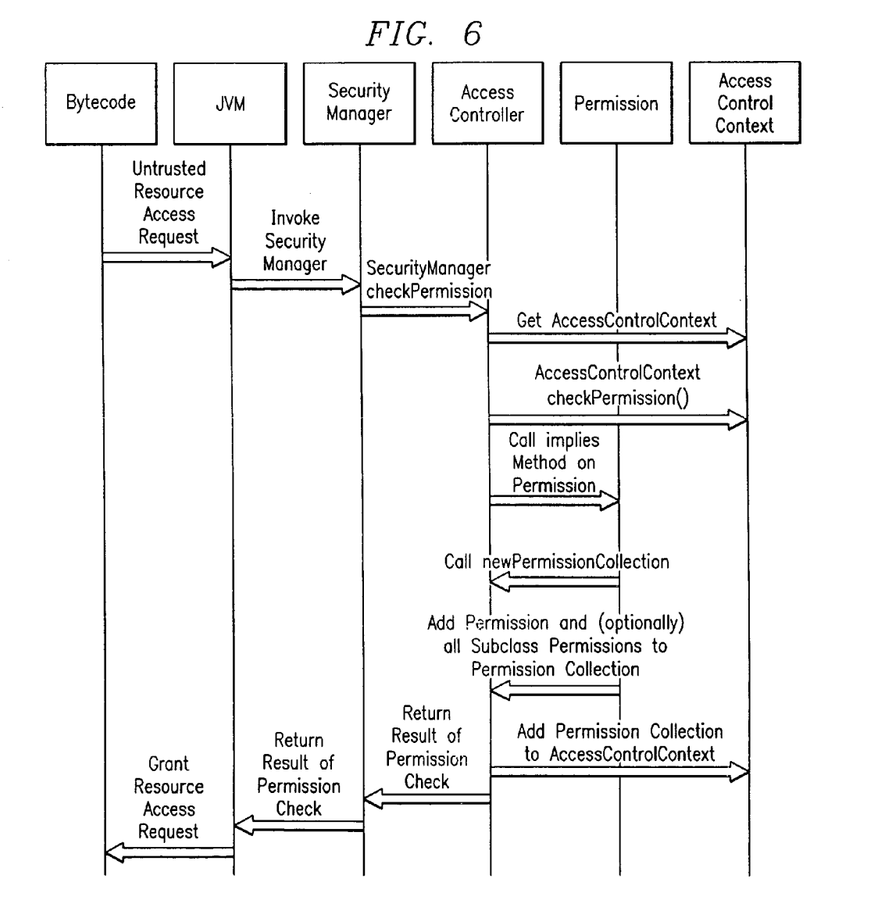
FIG. 6 is a diagram illustrating an operation of the present invention when an untrusted resource access request is processed.

FIG. 6 illustrates a first mechanism for performing the operations of the present invention. As shown in FIG. 6, when an untrusted resource access request is received from the bytecode 610, the JVM 620 invokes the SecurityManager 630 which determines the required permission based on the CodeSource and the resource. The SecurityManager 630 then calls a SecurityManager.checkPermission( ) method on the identified permission. This call results in a call of the AccessController.checkPermission( ) method which causes the Access-Controller 640 to retrieve the AccessControlContext for the execution thread and call the AccessControlContext.checkPermission( ) method on the AccessControlContext.

When the Access Controller calls the AccessControlContext.checkPermission( ) method, an implies method is called on each permission 650 in each relevant PermissionCollection of each ProtectionDomain in the AccessControlContext 660.

With this particular embodiment of the present invention, however, each permission is provided with a method called newPermissionCollection. The results of the calling of the implies method on the permission are input to the newPermissionCollection method. The newPermissionCollection method determines, based on these results, the superclass permission of the permission being checked and whether the superclass permission is present in each of the protection domains in the AccessControlContext stack.

If so, the permission being checked is added to the new PermissionCollection. The new PermissionCollection is then added to the AccessControlContext 660, if the permission check passes then control is given back to the SecurityManager, otherwise an exception is thrown. If, however, the superclass permission has not been granted, the resource access request is denied and the JVM 620 informs the bytecode 610 of the denial of access to the system resource and a SecurityException is thrown.

In an alternative embodiment, rather than checking the superclass permission to see if it has been granted and then adding only the permission being checked to the newPermissionCollection, the present invention may operate to add all subclass permissions of the checked permission to the new PermissionCollection. That is, the newPermissionCollection method may determine whether the superclass permission is present in each of the protection domains and if so, add the checked permission and any subclass permissions of the checked permission, as determined from the security policy, to the new PermissionCollection.

Figure 7A:
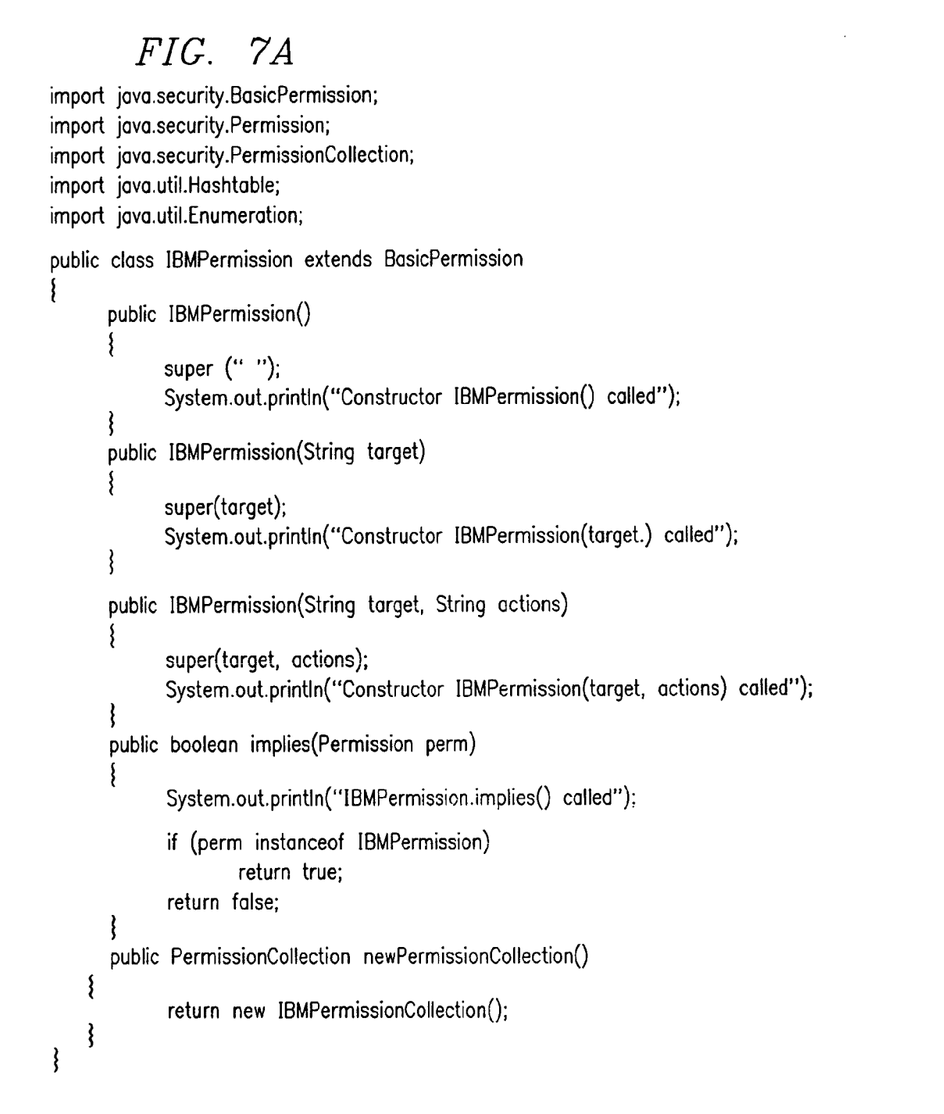
FIGS. 7A and 7B illustrate an exemplary superclass permission according to the present invention.
Figure 7B:
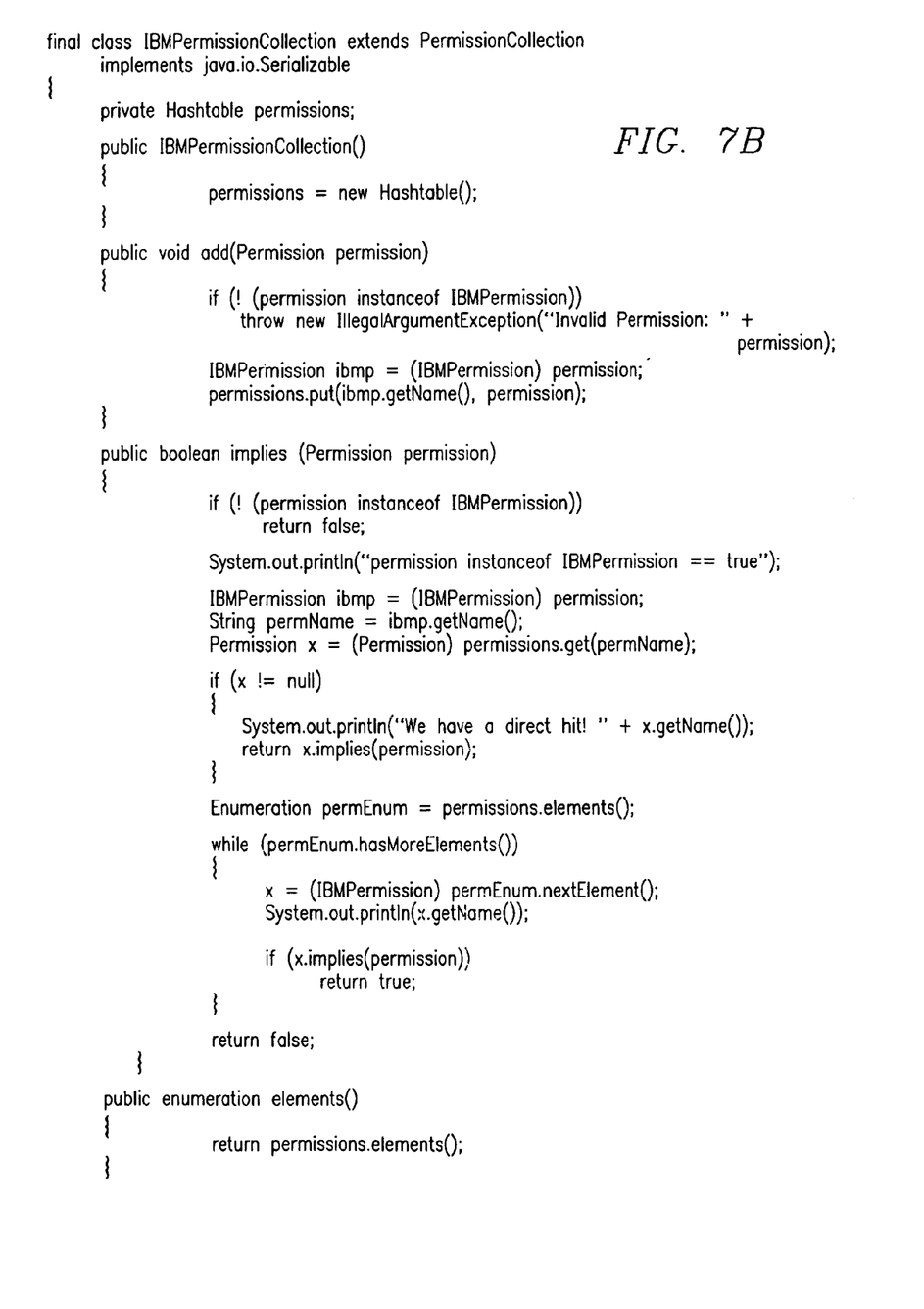

FIGS. 7A and 7B are exemplary diagrams of a superclass permission in accordance with the present invention. FIG. 7C is an exemplary diagram of a subclass permission according to the present invention. As shown in FIGS. 7A-7C, these permissions both include calls of the newPermissionCollection method which is used by the present invention to generate and return a new PermissionCollection that includes the permission being checked for and any subclass permissions of the permission being checked for. In addition, the subclass permission shown in FIG. 7C includes identification that the subclass permission WSPermission is a subclass of the superclass IBMPermission shown in FIGS. 7A and 7B.

Figure 8:
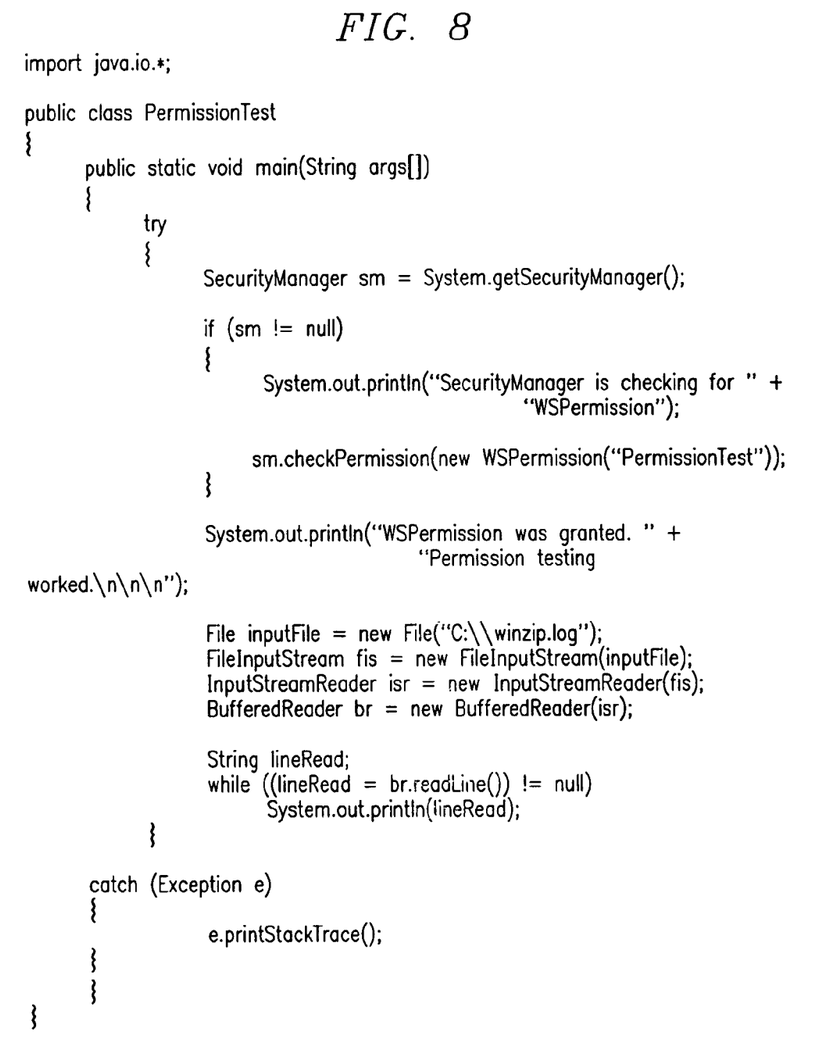
FIG. 8 is an exemplary illustration of code for performing the operations of the present invention using the base or superclass permission class, IBMPermission and inherited or subclass permission WSPermission.

FIG. 8 is an exemplary illustration of code for performing the operations of the present invention using the superclass permission IBMPermission and subclass permission WSPermission shown in FIGS. 7A and 7B. The sequence of events for checking a particular permission, as shown in FIG. 8, is as follows. First, the security manager calls a SecurityManager.checkPermission method on the permission. The call of the SecurityManager.checkPermission method causes an AccessController.checkPermission method to be called on the permission.

The current AccessControlContext is then retrieved and an AccessControlContext.checkPermission method is called on the permission. The AccessControlContext.checkPermission method calls an AccessControlContext.implies method on the AccessControlContext. The AccessControlContext.implies method calls a ProtectionDomain.implies method on the ProtectionDomain object.

The AccessControlContext.implies method calls a PermissionCollection.implies method on the PermissionCollection objects that are encapsulated in the ProtectionDomain. The PermissionCollection objects are obtained from the current security policy. It is then determined whether the PermissionCollection associated with the permission is present in the ProtectionDomain. If so, the PermissionCollection is returned. Otherwise, a new PermissionCollection is constructed by a call to the newPermissionCollection method. As shown in FIG. 8, when some code is granted IBMPermission, the PolicyFile instantiates a ProtectionDomain (referred to as "pd") that contains an IBMPermission object as part of an IBMPermissionCollection (which is in the Permissions object referred to as "perms"). When a call to Security Manager.checkPermission method is made, a permissions object implies method is called. At this point, the permission objects looks into an internal hashtable to see what PermissionCollection must be associated with the permission so that it can also see if that PermissionCollection.implies the permission or not. However, the permissions object does not know which PermissionCollection must be associated with the permission (it does know which Permission.Collection must be associated with an IBMPermission since an IBMPermission was specified in the security policy file, but it does not know about the permission yet). Therefore, it calls the newPermissionCollection method, which returns an IBMPermissionCollection object. This IBMPermissionCollection object is, empty and will not imply the WSPermission. Thus, a security exception will be thrown.

Figure 9:
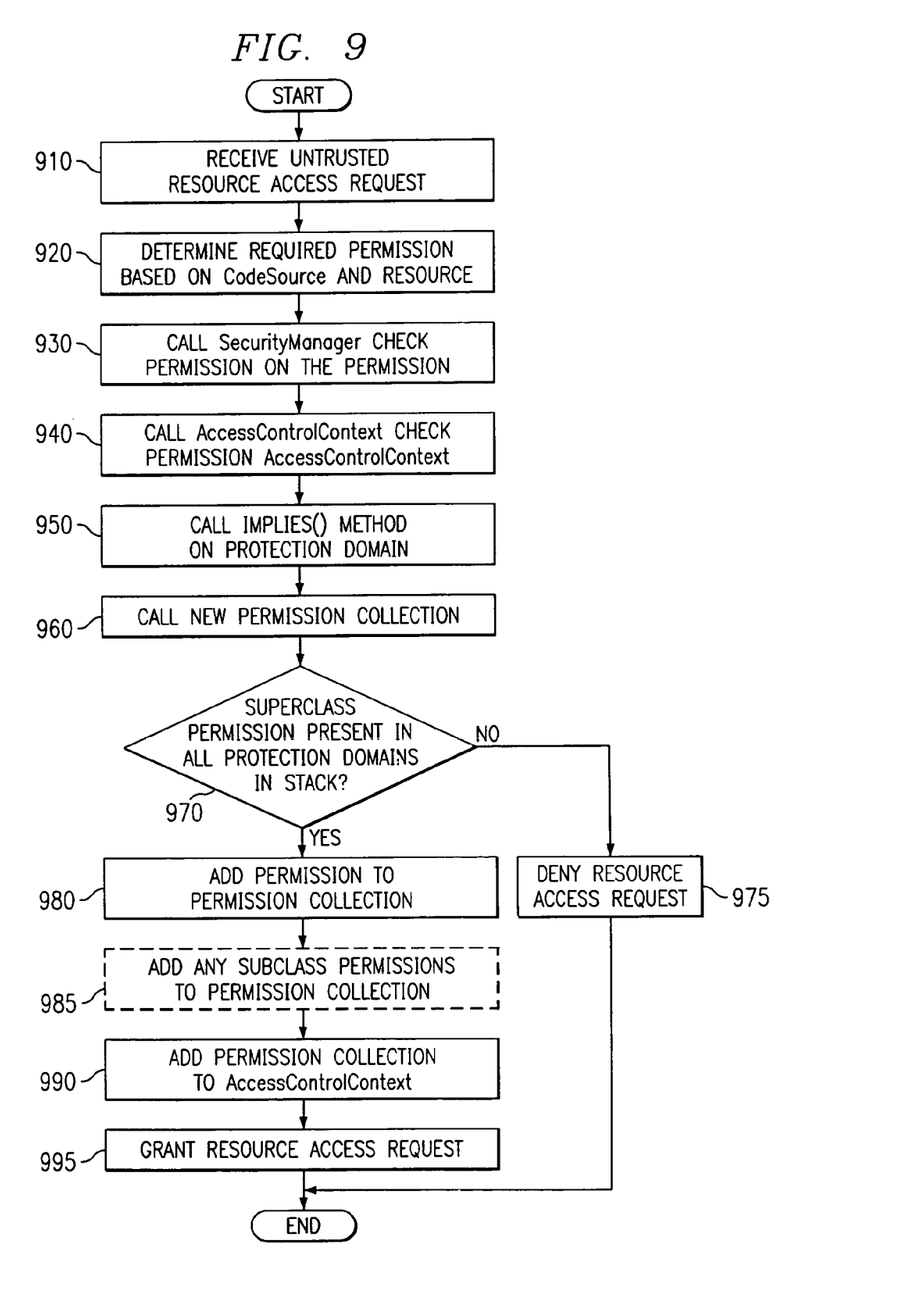
FIG. 9 is a flowchart outlining an exemplary operation of the present invention for adding permissions to a permission collection.

FIG. 9 is a flowchart outlining an exemplary operation of the present invention. As shown in FIG. 9, the operation starts with an untrusted resource access request being received (step 910). The required permission for the access request is determined based on the CodeSource and the resource (step 920). The SecurityManager.checkPermission method is called on the required permission (step 930). This causes an AccessController.checkPermission call which in turn calls an AccessControlContext.checkPermission call on the AccessControlContext for the thread of execution originating the resource access request (step 940).

The AccessControlContext.checkPermission call results in an implies method being called on each permission of each PermissionCollection in the ProtectionDomains of the AccessControlContext (step 950). The newPermissionCollection method of each permission is then called (step 960).

The newPermissionCollection method makes a determination as to whether a superclass permission of the required permission is present in each of the ProtectionDomains of the AccessControlContext (step 970). If not, the resource access request is denied, an exception is thrown (step 975) and no further processing occurs ends.

If the superclass permission is present in each of the ProtectionDomains, the required permission is added to the new PermissionCollection (step 980). In an alternative method, any subclass permissions of the required permission may also be added to the PermissionCollection (step 985, shown in dotted lines to indicate an alternative embodiment). The PermissionCollection is then added to the AccessControlContext (step 990) and the resource access request is granted (step 995).

In an alternative embodiment, the functionality described above may be hardcoded into the security policy file class such that modification of permissions to include the newPermissionCollection method is not necessary. Rather, the functions of the newPermissionCollection method may be hardcoded into the security policy file class such that the code operates on all permissions processed using this security policy class.

In this alternative embodiment, a subclass Policy of the superclass PolicyFile is created such that its getPermissions( ) method takes the Permissions object returned by the getPermissions( ) method of the superclass PolicyFile and, before returning it, determines if the Permissions object implies the superclass permission of the permission being checked, i.e. the superclass permission is present in each of the protection domains.

If the Permissions object implies the superclass permission, then the permission being checked is added to the permission collection of the Permissions object and the resource access request is granted. If the Permissions object does not imply the superclass permission, the permission being checked is not added to the PermissionCollection of the Permissions object and the resource access request is denied with an exception thrown.

Figure 10:
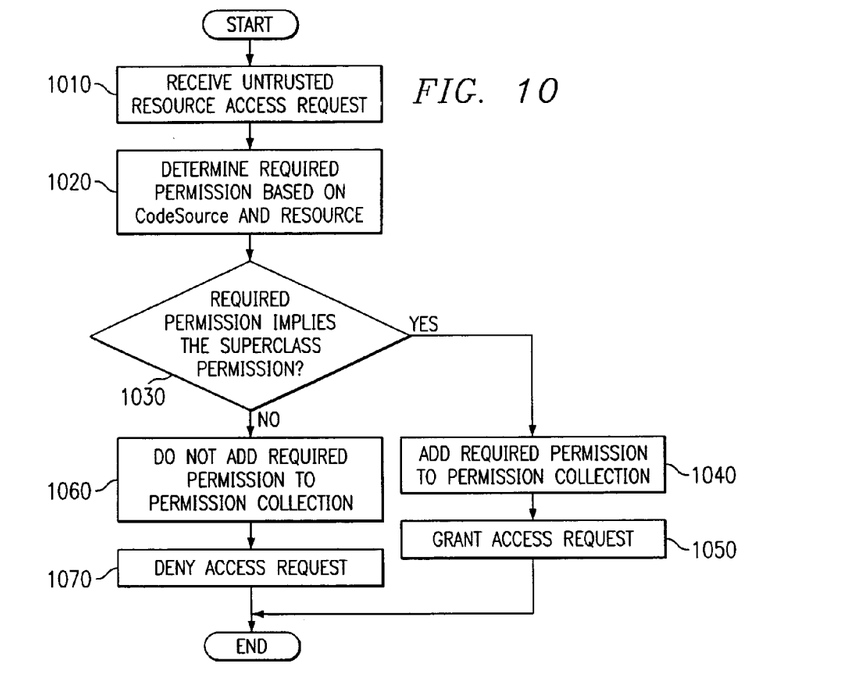
FIG. 10 is a flowchart outlining an exemplary operation of the present invention according to an alternative embodiment.

FIG. 10 is a flowchart outlining an exemplary operation of the present invention according to this alternative embodiment. As shown in FIG. 10, the operation starts with an untrusted resource access request being received (step 1010). The required permission for the access request is determined based on the CodeSource and the resource (step 1020). A determination is made as to whether the required permission implies the superclass permission of the required permission (step 1030).

If the permissions object implies the superclass permission, then the permission being checked is added to the permission collection of the Permissions object (step 1040) and the resource access request is granted (step 1050). If the Permissions object does not imply the superclass permission, the permission being checked is not added (step 1060) to the PermissionCollection of the Permissions object and the resource access request is denied with an exception thrown (step 1070).

Figure 11:
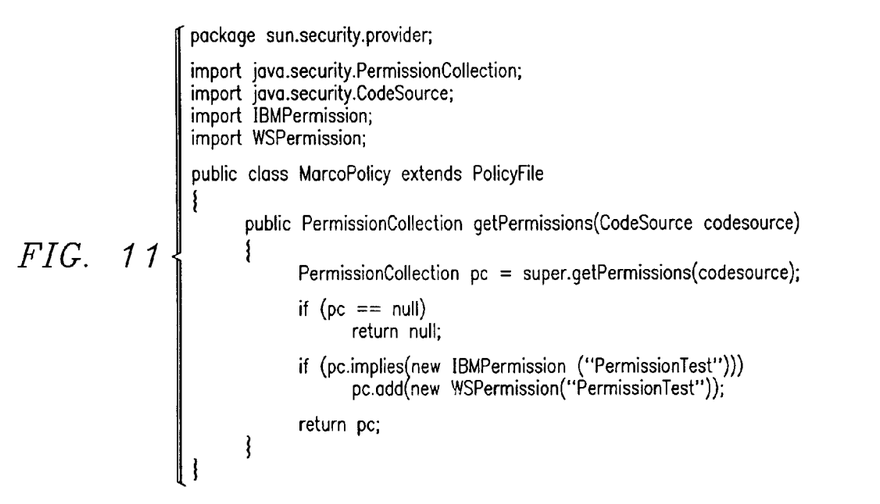
FIG. 11 is an example of code of a policy file according to the alternative embodiment.

FIG. 11 provides code for performing the operations according to this alternative embodiment. It should be noted that, for simplicity, the name of the IBMPermission subclass, WSPermission, is hardcoded in this PolicyFile subclass. In a more sophisticated implementation, the names of the subclasses may be hardcoded in a signed configuration file, and the PolicyFile subclass may check the signature before accepting to read that file and retrieve the names of the subclasses from it.

Thus, the present invention provides mechanisms by which a developer may grant a superclass permission to an installed class and obtain the benefit of subclasses without having to know the details of the security policy. This allows development and integration of applications into existing systems to be done seamlessly and with greater ease.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of controlling access to computer system resources based on permissions, comprising:
   receiving a request for access to a computer system resource;
   determining if a superclass permission of a required permission is present in each protection domain of an access control context, wherein the superclass permission is a super class of the required permission;
   adding the required permission to a permission collection if the superclass permission of the required permission is present in each protection domain of the access control context; and
   granting access to the resource if the superclass permission of the required permission is present in each protection domain of the access control context;
   wherein adding the required permission to a permission collection includes creating a new permission collection and adding the required permission to the new permission collection; and
   wherein the adding the required permission to a permission collection further includes adding any subclass permissions of the required permission to the new permission collection.

2. The method of claim 1, wherein the request is received from bytecode.

3. The method of claim 1, further comprising:
   determining the required permission based on a CodeSource associated with the request; and
   determining the superclass permission of the required permission based on the required permission.

4. The method of claim 1, wherein determining if a superclass permission of a required permission is present in each protection domain includes determining if at least one permission collection in each protection domain includes the superclass permission.

5. The method of claim 1, further comprising retrieving the access control context for a thread of execution that sent the request for access to the computer system resource.

6. The method of claim 1, wherein adding the required permission to a permission collection includes adding the permission to a permission collection associated with the superclass permission.

7. The method of claim 1, wherein the steps of determining if a superclass permission of a required permission is present in each protection domain of an access control context, and adding the required permission to a permission collection if the superclass permission of the required permission is present in each protection domain of an access control context are performed by a method called by the required permission in response to an implies method operating on the required permission.

8. The method of claim 3, wherein the steps of determining the required permission based on a CodeSource associated with the request and determining the superclass permission of the required permission based on the required permission are performed based on a security policy file.

9. A computer program product in a compute readable medium for controlling access to computer system resources based on permissions, comprising:
   first instructions for receiving a request for access to a computer system resource;
   second instructions for determining if a superclass permission of a required permission is present in each protection domain of an access control context, wherein the superclass permission is a super class of the required permission;
   third instructions for adding the required permission to a permission collection if the superclass permission of the required permission is present in each protection domain of the access control context; and
   fourth instructions for granting access to the computer system resource if the superclass permission of the required permission is present in each protection domain of the access control context;
   wherein the third instructions for adding the required permission to a permission collection include instructions for creating a new permission collection and instructions for adding the required permission to the new permission collection; and
   wherein the third instructions for adding the required permission to a permission collection further include instructions for adding any subclass permissions of the required permission to the new permission collection.

10. The computer program product of claim 9, wherein the request is received from bytecode.

11. The computer program product of claim 9, further comprising:
    fifth instructions for determining the required permission based on a CodeSource associated with the request; and
    sixth instructions for determining the superclass permission of the required permission based on the required permission.

12. The computer program product of claim 9, wherein the second instructions for determining if a superclass permission of a required permission is present in each protection domain include instructions for determining if at least one permission collection in each protection domain includes the superclass permission.

13. The computer program product of claim 9, further comprising fifth instructions for retrieving the access control context for a thread of execution that sent the request for access to the computer system resource.

14. The computer program product of claim 9, wherein the third instructions for adding the required permission to a permission collection include instructions for adding the permission to a permission collection associated with the superclass permission.

15. The computer program product of claim 9, wherein the second and third instructions are part of a method called by the required permission in response to an implies method operating on the required permission.

16. The computer program product of claim 11, wherein the fifth and sixth instructions are executed based on a security policy file.

17. An apparatus for controlling access to computer system resources based on permissions, comprising:
   means for receiving a request for access to a computer system resource;
   means for determining if a superclass permission of a required permission is present in each protection domain of an access control context, wherein the superclass permission is a super class of the required permission;
   means for adding the required permission to a permission collection if the superclass permission of the required permission is present in each protection domain of the access control context; and means for granting access to the computer system resource if the superclass permission of the required permission is present in each protection domain of the access control context;
   where the means for adding the required permission to a permission collection includes means for creating a new permission collection and means for adding the required permission to the new permission collection; and
   wherein the means for adding the required permission to a permission collection further includes adding any subclass permissions of the required permission to the new permission collection.

18. The apparatus of claim 17, wherein the request is received from bytecode.

19. The apparatus of claim 17, further comprising:
   means for determining the required permission based on a CodeSource associated with the request; and
   means for determining the superclass permission of the required permission based on the required permission.

20. The apparatus of claim 17, wherein the means for determining if a superclass permission of a required permission is present in each protection domain includes means for determining if at least one permission collection in each protection domain includes the superclass permission.

21. The apparatus of claim 17, further comprising means for retrieving the access control, context for a thread of execution that sent the request for access to the computer system resource.

22. The apparatus of claim 17, wherein the means for adding the required permission to a permission collection includes means for adding the permission to a permission collection associated with the superclass permission.

23. The apparatus of claim 17, wherein the means for determining if a superclass permission of a required permission is present in each protection domain of an access control context, and the means for adding the required permission to a permission collection if the superclass permission of the required permission is present in each protection domain of an access control context operate based on a method called by the required permission in response to an implies method operating on the required permission.

24. The apparatus of claim 19, wherein the means for determining the required permission based on a CodeSource associated with the request and means for determining the superclass permission of, the required permission based on the required permission operate based on a security policy file.

* * * * *